April 16, 1940.   L. T. BLASEN   2,197,121
ANIMAL TRAP
Filed July 3, 1939   2 Sheets-Sheet 1
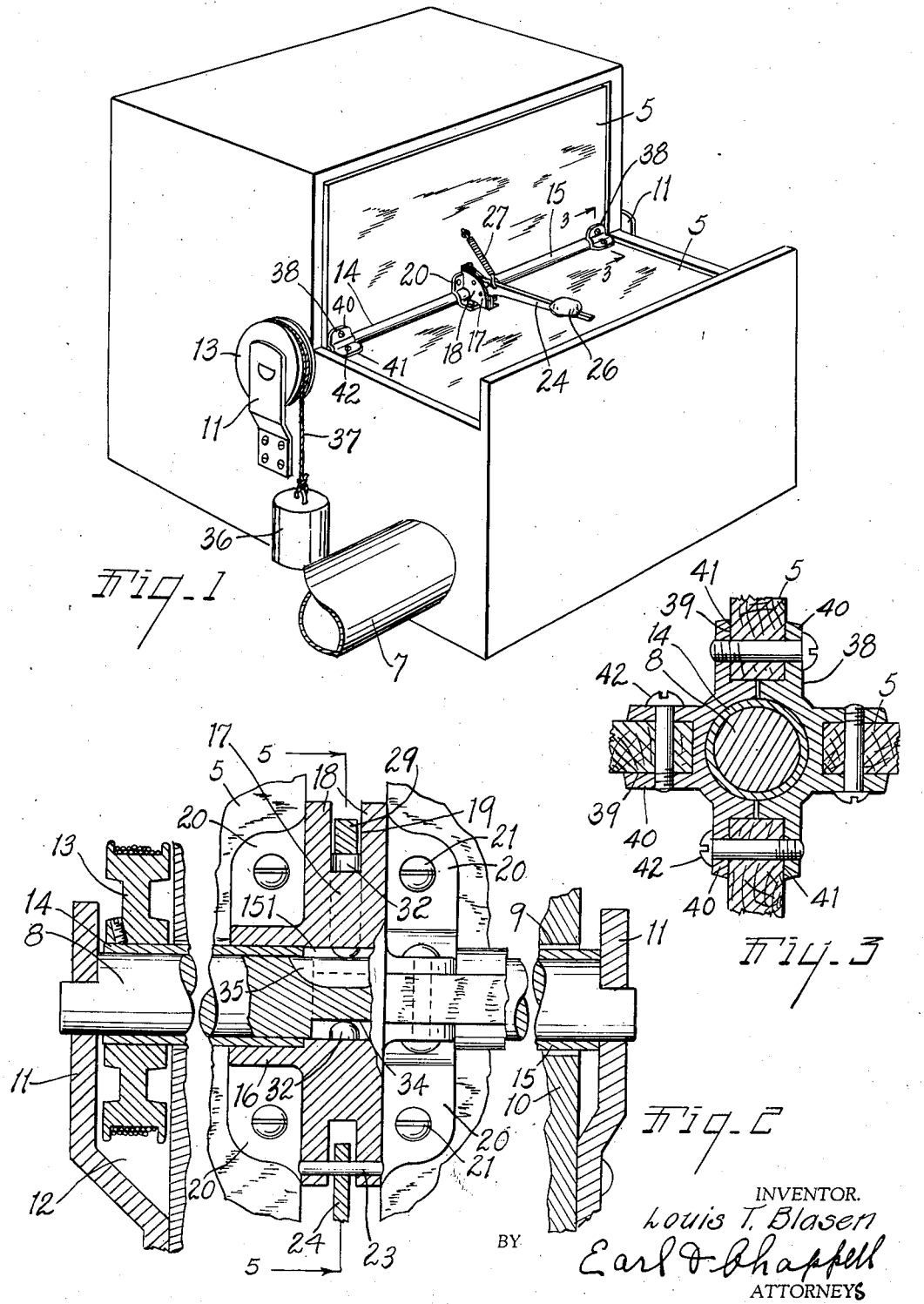
INVENTOR.
Louis T. Blasen
BY Earl D. Chappell
ATTORNEYS April 16, 1940.  L. T. BLASEN  2,197,121
ANIMAL TRAP
Filed July 3, 1939  2 Sheets-Sheet 2

INVENTOR.
Louis T. Blasen
BY Earl T. Chappell
ATTORNEYS.

Patented Apr. 16, 1940

2,197,121

UNITED STATES PATENT OFFICE 2,197,121

ANIMAL TRAP

Louis T. Blasen, Saranac, Mich.

Application July 3, 1939, Serial No. 282,613

13 Claims. (Cl. 43—74)

The main objects of my invention are:

First, to provide an improved rat or animal trap which is relatively simple in construction and highly successful in its results.

Second, to provide a trap of the type described which is automatic and self-setting in operation to thereby require no attention other than baiting and removal of the animals trapped thereby.

Third, to provide a trap of the type described having provision for removing animals trapped therein to a distance to thereby prevent their warning other animals of the presence of the trap.

Fourth, to provide a trap of the type including a series of rotary plates or trap doors having novel provision for rotatably mounting the same and for supporting the same in operative position for release by an animal actuated trip.

Further objects relating to details and economies of my invention will definitely appear from the description to follow. The invention is defined in the claims.

A structure embodying the features of my invention is illustrated in the accompanying drawings, wherein:

Fig. 1 is a perspective view partially broken away illustrating the trap of my invention including a portion of a passage way for leading the animals trapped to a distance from the trap itself.

Fig. 2 is an enlarged fragmentary view in section on line 2—2 of Fig. 5, illustrating details of the construction of the operating or control mechanism of my trap.

Fig. 3 is an enlarged fragmentary view in transverse vertical section through the trap door mounting spindle, further illustrating details of the construction.

Figure 4:
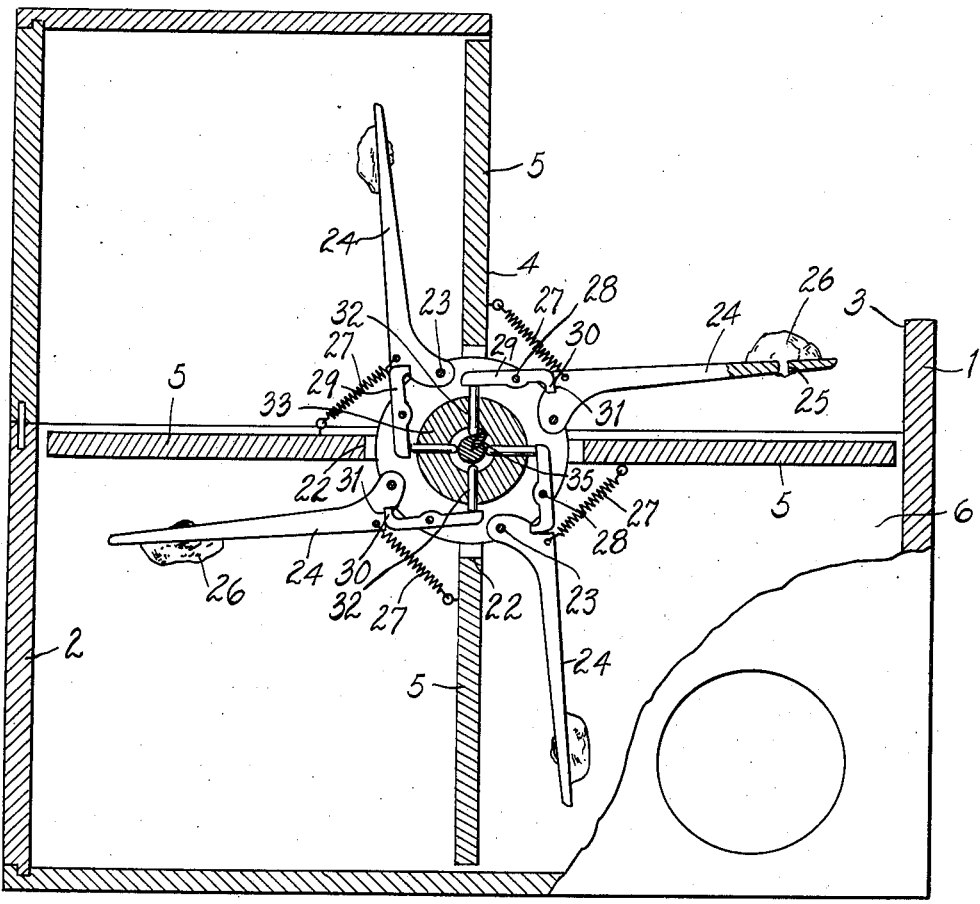
Fig. 4 is a side view partially broken away and in transverse vertical section illustrating the construction and arrangement of the rotatable trap door and trip control assembly.
Figure 5:
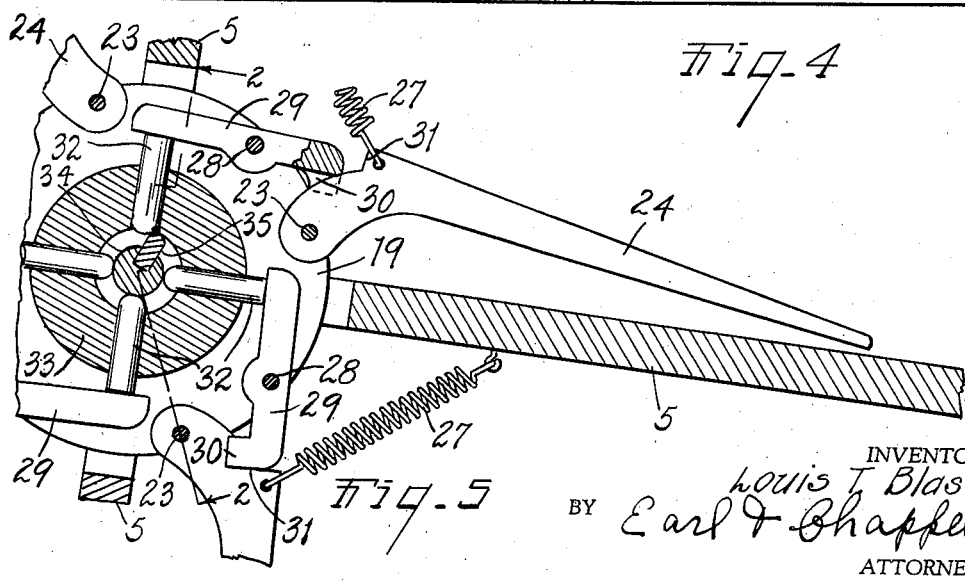
Fig. 5 is an enlarged fragmentary view in section on line 5—5 of Fig. 2, further illustrating details of the construction and operation of my device.

Referring to the drawings, the reference numeral 1 in general indicates the trap of my invention, which includes a suitable box-like receptacle 2 having a corner of the same cut away at 3 and provided with a rotatable trap door assembly 4 mounted centrally thereof, said assembly having radial trap doors 5 disposed at 90° to one another.

These trap doors 5 are successively rotatable under the control of an animal actuated trip mechanism to be hereinafter described, into position to constitute a floor or bottom for the cut away space 3, the next succeeding trap door 5 constituting a vertical wall for this space, as illustrated in Figs. 1 and 4. Immediately beneath the aforesaid floor or bottom, there is a trapping or receiving compartment 6 into which rats or animals fall upon release of the tripping mechanism referred to and this compartment has connected thereto an elongated pipe or passage way element 7 through which the rats or animals trapped are led away to a point distant from the trap. I find that some provision such as the said passage way member is highly desirable in a trap of the type described, particularly for use in trapping rats, since these animals when confined in a trap having the habit of emitting certain warning or alarming cries or noises which other animals recognize. The pipe or passage member 7 may lead to a further cage or enclosure or, if desired, to a suitable means for killing or disposing of the animals trapped.

The trap door assembly 4 consists of a fixed spindle or journal 8 which, as clearly illustrated in Fig. 2, extends transversely of the trap 1 through apertures 9 in the side walls 10 thereof and is non-rotatably held by brackets 11 attached to the said side walls. One of the brackets is offset outwardly somewhat more than the other to provide a space 12 for receiving a pulley 13 which is attached by a set screw to a sleeve 14 rotatable on the spindle 8. There is a similar sleeve 15 rotatably mounted on the spindle at the opposite end thereof, the sleeves being axially spaced centrally of the receptacle at 15¹, and these sleeves have secured thereon for rotation relative to the spindle a plate or trap floor supporting unit 16, which is illustrated in Fig. 2.

The unit 16 consists of a supporting casting 17 having a pair of continuous central radially extending flanges 18 spaced laterally or axially to provide an annular channel 19. The casting also has pairs of spaced ears 20 integral with the flanges 18 between which the radial trap door members 5 are disposed and secured by screws 21, these trap door members being cut away at 22 to receive the flanges 18 of the supporting casting. Extending transversely of the annular channel 19 and parallel to spindle 8 I provide a plurality of pivot pins 23 (see Figs. 2 and 4) on which are pivotally mounted the trap door release or trip arms 24. Each of these arms extends outwardly over and approximately parallel to its corresponding trap door and is provided with means 25 for affixing a quantity of a suitable bait 26 thereto. Each of the arms is urged in counter-clockwise movement about its pivot 23 by means of a coil spring 27 secured thereto and to the succeeding trap door member 5.

The channel 19 also has extending transversely thereof a plurality of further pivot pins 28 for the pivoted detent elements or fingers 29, these fingers each having an outer lug 30 engaging a notch or recess 31 on the rear portion of the arm 24. The fingers 29 are engaged by radially acting bolts or catch elements 32 slidable in radial bores in the body 33 of the casting 17. As illustrated in Fig. 2, the spindle 8 is cut away or reduced in diameter at 34 adjacent the bolt elements 32 and the spindle is provided with a fixed spline-like keeper or stop 35 extending flush with the outer periphery of the spindle. Normally, when the trap is set, the bolt element 32 corresponding to the operatively or horizontally positioned trap door 5 engages this radial stop as illustrated in Fig. 4 and since the bait holding trip arm 24 is operatively engaged with the detent finger 29 under the influence of coil spring 27, the stop 35 obstructs and prevents angular passage of the bolt element 32 and the supporting casting on which it is mounted, with the result that the trap door is positively held in operative position. When the trip arm 24 is depressed, however, as by a rat or animal feeding on the bait 26, the detent is released by the arm, with the result that the bolt element will yield radially and pass over the stop, the trap door falling and precipitating the animal into receiving compartment 6.

In order that the trap door will have a very rapid rotation following release of the detent finger 29, the pulley 13 on sleeve 14 is actuated by means of a weight 36 and cord 37 trained therearound, this sleeve 14 in turn rotatably actuating the trap door unit 16 secured thereto. For the purpose of simplicity, I have illustrated the weight and cord in Fig. 1 as merely depending from the pulley 13, however in order to afford sufficient room for the weight to descend following successive operations of the trap, it will be found advisable to pass the cord over a further suitably elevated pulley (not shown) or to provide suitable fall space for the weight.

By the foregoing instrumentalities, the trap door is withdrawn or drops from beneath an animal thereon with exceeding rapidity once the trip arm is actuated by the animal. Following withdrawal of the trap door and passage of the radial bolt by the stop 35, the arm 24 is again urged by spring 27 to bring finger 29 into initial operative position relative to the notch or recess 31 in arm 24, the bolt element thereafter sliding around the reduced periphery of the spindle until it again engages the stop 35 and is held thereby.

In Fig. 3, I illustrate additional clamp means supplementing the action of the spaced ears 20 on the casting 17 in securing the trap door members 5 to sleeves 14, 15, this means being in the form of pairs of cast elements 38 each of which has a radially opening channel 39 receiving a trap door member and a further radially extending ledge 40 coacting with a similar ledge on the opposed element 38 of the pair to provide a further channel 41 receiving a trap door member. The last named members are clamped in place by means of machine screws 42, two of which serve to secure the cast members 38 together therein. These clamp units are positioned at the sides of the trap door members in the manner shown in Fig. 1.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. An animal trap comprising a rotatably mounted trap door unit including a plurality of radially disposed trap door members, a support therefor, a receptacle, and means for rotatably mounting said support on said receptacle including a fixed spindle in the receptacle, a sleeve rotatable on said spindle and having said support secured thereto, trip means for said unit comprising a trip arm pivoted on the support and extending adjacent a trap door member, means for biasing said arm in one direction, a detent member likewise pivoted on said support and engaging said arm, a bolt element controlled by said detent member, said bolt element being radially slidable in said support and engageable upon angular movement of the sleeve and support with a fixed stop on said spindle, said arm being adapted to receive bait and to be depressed by an animal in opposition to said biasing means to release the detent member and permit radial movement of the bolt element and angular passage of the element past said stop whereby said support and trap doors rotate to withdraw a trap door from beneath the animal, and means for accelerating the withdrawal of the trap door, comprising a pulley secured to said sleeve for rotation with the unit, said pulley having a tension cord secured thereto, and a weight on said cord whereby upon release of the detent member and bolt element the weight causes rapid rotation of the unit in a direction to withdraw the trap door.

2. An animal trap comprising a rotatably mounted trap door unit including a plurality of radially disposed trap door members, a support thereof, a receptacle, and means for rotatably mounting said support on said receptacle, trip means for said unit comprising a trip arm pivoted on the support and extending adjacent a trap door member, means for biasing said arm in one direction, a detent member likewise pivoted on said support and engaging said arm, a bolt element controlled by said detent member, a fixed stop, said bolt element being radially slidable in said support and engageable upon angular movement of the sleeve and support with said fixed stop, said arm being adapted to receive bait and to be depressed by an animal in opposition to said biasing means to release the detent member and permit radial movement of the bolt element and angular passage of the element past said stop whereby said support and trap doors rotate to withdraw a trap door from beneath the animal, and means for accelerating the withdrawal of the trap door, comprising a pulley secured to said sleeve for rotation with the unit, said pulley having a tension cord secured thereto, and a weight on said cord whereby upon release of the detent member and bolt element the weight causes rapid rotation of the unit in a direction to withdraw the trap door.

3. An animal trap comprising a rotatably mounted trap door unit including a plurality of radially disposed trap door members, a support therefor, a receptacle, and means for rotatably mounting said support on said receptacle, trip means for said unit comprising a trip arm pivoted on the support and extending adjacent a trap door member, means for biasing said arm in one direction, a detent member likewise pivoted on said support and engaging said arm, a bolt element controlled by said detent member, a fixed stop, said bolt element being radially slidable in said support and engageable upon angular movement of the sleeve and support with said fixed stop, said arm being adapted to receive bait and to be depressed by an animal in opposition to said biasing means to release the detent member and permit radial movement of the bolt element and angular passage of the element past said stop whereby said support and trap doors rotate to withdraw a trap door from beneath the animal, and means for accelerating the withdrawal of the trap door.

4. An animal trap comprising a rotatably mounted trap door unit including a plurality of radially disposed trap door members, a support therefor, a receptacle, and means for rotatably mounting said support on said receptacle, trip means for said unit comprising a trip arm pivoted on the support and extending adjacent a trap door member, a detent member likewise pivoted on said support and engaging said arm, and a bolt element controlled by said detent member, a fixed stop, said bolt element being radially slidable in said support and engageable upon angular movement of the sleeve and support with said fixed stop, said arm being adapted to receive bait and to be depressed by an animal to release the detent member and permit radial movement of the bolt element and angular passage of the element past said stop whereby said support and trap doors rotate to withdraw a trap door from beneath the animal.

5. An animal trap comprising a rotatably mounted trap door unit including a plurality of radially disposed trap door members, a receptacle, and means for rotatably mounting said unit on said receptacle including a fixed spindle in the receptacle, a sleeve rotatable on said spindle and having said unit secured thereto, trip means for said unit comprising an animal actuated trip arm pivoted on the unit and extending adjacent a trap door member, means for biasing said arm in one direction, a detent member likewise pivoted on said unit and engaging said arm to normally restrain movement thereof in response to said biasing means, a bolt controlled by said detent member, said bolt being radially slidable in said unit and engageable with a fixed stop on said spindle to obstruct further angular movement of the unit on the spindle, said arm being adapted to receive bait and to be depressed by an animal in opposition to said biasing means to release the detent member and permit radial movement of the bolt for angular passage of the bolt past said stop whereby to withdraw a trap door from beneath the animal, and means for accelerating the withdrawal of the trap door.

6. An animal trap comprising a rotatably mounted trap door unit including a plurality of radially disposed trap door members, a receptacle, and means for rotatably mounting said unit on said receptacle including a fixed spindle in the receptacle, a sleeve rotatable on said spindle and having said unit secured thereto, trip means for said unit comprising an animal actuated trip arm pivoted on the unit and extending adjacent a trap door member, means for biasing said arm in one direction, means acting on said trip arm in opposition to said biasing means and controlled by said trip arm to cause angular movement of said unit on the spindle, said arm being adapted to receive bait and to be depressed by an animal in opposition to said biasing means to release said means controlled thereby to withdraw a trap door from beneath the animal, and means for accelerating the withdrawal of the trap door.

7. An animal trap comprising a rotatably mounted trap door unit including a plurality of radially disposed trap door members, a receptacle, and means for rotatably mounting said unit on said receptacle including a fixed spindle in the receptacle, a sleeve rotatable on said spindle and having said unit secured thereto, trip means for said unit comprising an animal actuated trip arm pivoted on the unit and extending adjacent a trap door member, means for biasing said arm in one direction, and means acting on said trip arm in opposition to said biasing means and controlled by said trip arm to cause angular movement of said unit on the spindle, said arm being adapted to receive bait and to be depressed by an animal in opposition to said biasing means to release said means controlled thereby to withdraw a trap door from beneath the animal.

8. In a trap of the type described, a receptacle, a trap door member including a plurality of radially disposed trap doors rotatably mounted in said receptacle, means for rotatably mounting said member on the receptacle including a fixed spindle on the receptacle, means for releasably supporting said trap door in operative position, comprising a fixed stop on said spindle, a radially acting bolt element slidable in said trap door member and engageable with said stop to prevent rotation of the member, a bait holding trip arm pivoted on said trap door member, a detent member pivotally mounted on the trap door member and having portions engaging said trip arm and said bolt element to control the latter by the former, and resilient means biasing said trip arm in a direction to maintain said engagement whereby the bolt element is restrained from radial movement and in turn coacts with the stop to restrain angular movement of the trap door member on said spindle, depression of said trip arm releasing said detent member to terminate said engagement and permit said angular movement.

9. In a trap of the type described, a receptacle, a trap door member including a plurality of radially disposed trap doors rotatably mounted in said receptacle, means for rotatably mounting said member on the receptacle including a fixed spindle on the receptacle, means for releasably supporting said trap door in operative position, comprising a fixed stop on said spindle, a radially acting bolt element engageable with said stop to prevent rotation of the member, a bait holding trip arm pivoted on said trap door member, a detent member on the trap door member engaging said trip arm and said bolt element to control the latter by the former, and resilient means biasing said trip arm in a direction to maintain said engagement whereby the bolt element is restrained from radial movement and in turn coacts with the stop to restrain angular movement of the trap door member on said spindle, depression of said trip arm releasing said detent member to terminate said engagement and permit said angular movement.

10. In a trap of the type described, a receptacle, a trap door member including a plurality of radially disposed trap doors rotatably mounted in said receptacle, means for rotatably mounting said member on the receptacle, means for releasably supporting said trap door in operative position, comprising a fixed stop, a radially acting bolt element engageable with said stop to prevent rotation of the member, a bait holding trip arm pivoted on said trap door member, a detent member on the trap door member engaging said trip arm and said bolt element to control the latter by the former, and resilient means biasing said trip arm in a direction to maintain said engagement whereby the bolt element is restrained from radial movement and in turn coacts with the stop to restrain angular movement of the trap door member, depression of said trip arm releasing said detent member to terminate said engagement and permit said angular movement.

11. In a trap of the type described, a receptacle, a trap door member including a plurality of radially disposed trap doors rotatably mounted in said receptacle, means for rotatably mounting said member, means for releasably supporting said trap door in operative position, comprising a fixed stop, a radially acting bolt element retractably mounted on said trap door member and engageable with said stop to prevent rotation of the member, a bait holding trip arm pivoted on said trap door member, means for controlling said bolt element by said trip arm whereby the bolt element is normally restrained from retractile movement and in turn restrains angular movement of the trap door member by engagement with said stop, depression of said trip arm releasing said latch arm for retraction and permitting said angular movement, and means for accelerating said movement, said receptacle having an elongated passage way connected thereto for leading animals trapped to a distance from the trap.

12. In a trap of the type described, a receptacle, a trap door member including a plurality of radially disposed trap doors rotatably mounted in said receptacle, means for rotatably mounting said member, means for releasably supporting said trap door in operative position, comprising a fixed stop, a radially acting bolt element retractably mounted on said trap door member and engageable with said stop to prevent rotation of the member, a bait holding trip arm pivoted on said trap door member, means for controlling said bolt element by said trip arm whereby the bolt element is normally restrained from retractile movement and in turn restrains angular movement of the trap door member by engagement with said stop, depression of said trip arm releasing said latch arm for retraction and permitting said angular movement, and means for accelerating said movement.

13. In a trap of the type described, a receptacle, a trap door member including a plurality of radially disposed trap doors rotatably mounted in said receptacle, means for rotatably mounting said member, means for releasably supporting said trap door in operative position, comprising a fixed stop, a radially acting bolt element retractably mounted on said trap door member and engageable with said stop to prevent rotation of the member, a bait holding trip arm pivoted on said trap door member, and means for controlling said bolt element by said trip arm whereby the bolt element is normally restrained from retractile movement and in turn restrains angular movement of the trap door member by engagement with said stop, depression of said trip arm releasing said latch arm for retraction and permitting said angular movement.

LOUIS T. BLASEN.